United States Patent
Ozawa (10) Patent No.: US 8,919,948 B2
(45) Date of Patent: Dec. 30, 2014

(54) INK FOR INK JET RECORDING APPARATUS, AND IMAGE FORMING METHOD

(71) Applicant: KYOCERA Document Solutions Inc., Osaka-shi, Osaka (JP)

(72) Inventor: Noriaki Ozawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/257,227

(22) Filed: Apr. 21, 2014

(65) Prior Publication Data

US 2014/0313258 A1   Oct. 23, 2014

(30) Foreign Application Priority Data

Apr. 19, 2013   (JP) .................. 2013-088444

(51) Int. Cl.
*C09D 11/00* (2014.01)
*C09D 11/38* (2014.01)
*B41J 2/01* (2006.01)
*C08K 5/053* (2006.01)

(52) U.S. Cl.
CPC .............. *C09D 11/38* (2013.01); *C08K 5/053* (2013.01); *B41J 2/01* (2013.01)
USPC ........................................ 347/100

(58) Field of Classification Search
USPC ........................................... 347/100
See application file for complete search history.

(56) References Cited

U.S. PATENT DOCUMENTS

| | | | |
|---|---|---|---|
| 6,051,057 A | 4/2000 | Yatake et al. | |
| 2002/0077386 A1 | 6/2002 | Kurabayashi et al. | |
| 2004/0259978 A1 | 12/2004 | Tani et al. | |
| 2012/0196966 A1* | 8/2012 | Ozawa et al. | 524/377 |
| 2013/0127953 A1* | 5/2013 | Furukawa et al. | 347/68 |
| 2013/0321522 A1* | 12/2013 | Ozawa | 347/20 |

FOREIGN PATENT DOCUMENTS

| | | |
|---|---|---|
| EP | 1 688 465 | 8/2006 |
| JP | 8-193175 | 7/1996 |
| JP | 2005-8725 | 1/2005 |
| JP | 2005-154549 | 6/2005 |
| JP | 2005-336496 | 12/2005 |

* cited by examiner

*Primary Examiner* — Laura Martin
(74) *Attorney, Agent, or Firm* — Gerald E. Hespos; Michael J. Porco; Matthew T. Hespos (57) ABSTRACT

An ink for an ink jet recording apparatus, is provided, wherein the ink contains prescribed quantities of each of water, a pigment dispersion, a penetrant, a non-ionic water-soluble acrylic resin having prescribed characteristics, and a surfactant of a compound represented by general formula (I), (II) or (III).

5 Claims, 3 Drawing Sheets

INK FOR INK JET RECORDING APPARATUS, AND IMAGE FORMING METHOD

This application is based on patent application no. 2013-088444, which was filed with the Japan Patent Office on 19 Apr. 2013, and incorporates the contents of patent application no. 2013-088444 by reference.

BACKGROUND

The present disclosure relates to an ink for an ink jet recording apparatus, and also to an image forming method that uses this ink.

In recent years, rapid advances in recording technology have enabled high definition images that compare with silver salt photographs to be obtained, meaning that ink jet recording apparatuses, which form images by ink jet recording methods, are widely used as image forming apparatuses.

There is a strong demand for such an ink jet recording apparatus in which image quality can be maintained while increasing the image forming speed. However, when forming images at high speeds using ink jet recording apparatuses, the recording medium, such as a paper, passes through a pair of discharge rollers and is discharged before the ink can penetrate into the recording medium, meaning that the ink can become deposited (offset) on the discharge rollers. In such cases, image defects readily occur in formed images due to ink that has been deposited on the discharge rollers becoming deposited on the recording medium.

In order to suppress the occurrence of offsetting, reducing the quantity of ink discharged per pixel has been considered. However, forming an image having the desired image density is difficult in such cases. Therefore, in order to suppress the occurrence of offsetting while forming an image having the desired image density, a great deal of consideration has been given to compounds which can be incorporated in an ink in order to improve the penetration of the ink into a recording medium.

With such circumstances in mind, a proposal was made for an ink that contains a compound in which a specific quantity of ethylene oxide and/or propylene oxide is added to a straight chain alkanol as an ink which exhibits excellent penetration into a recording medium (drying properties) and which can form a high quality image (prior art 1).

In addition, inks that contain specified quantities of non-ionic polymers in pigments have also been reported (prior art 2 and 3). Furthermore, an ink to which acetylene glycol (a surfactant) is added has also been proposed (prior art 4).

Here, in order to form a high quality image, it is desirable for dots, which are formed by ink droplets impacting upon a recording medium, to have a sufficiently large dot diameter and to have a shape that is nearly circular. However, the ink in prior art 1 cannot easily form dots that are nearly circular, whereby it is difficult to form a high quality image.

Meanwhile, the inks in prior art 2 and 3 use poly(vinyl alcohol) or polyvinylpyrrolidone, not an acrylic polymer, as a water-soluble polymer (resin), and because these substances cause the surface tension of the ink to increase, inks containing these substances have the problem of poor continuous discharge properties.

Furthermore, in addition to high quality, there are demands for even faster printing speeds in the field of printing these days. In order to achieve higher printing speeds, shortening the drive timing of a recording liquid discharged from a recording head, lining up small recording heads in a band-like pattern and using long line heads have been considered. However, when printing with a line head, problems occur in terms of continuous printing properties, print quality and satellite formation.

First, with regard to continuous printing properties, because continuous printing conditions are such that ink is continuously discharged from heads, problems occur due to jetting twisting or non-discharge caused by ink misting or ink deposits at the edge of nozzle openings and the like.

With regard to print quality (print density), problems relating to print density, strike-through and unevenness in darkness are given as examples of problems that occur in terms of print quality on ordinary paper. Strike-through density increases if the surface tension of the ink is low or if the ink excessively wets the paper. In addition, in cases in which the ink has a high surface tension or in cases in which the wettability to the paper is insufficient, unevenness in darkness can occur, leading to concerns that the print density will be reduced.

Satellites are a problem caused by discharged liquid droplets splitting and the landing position of a single dot becoming misaligned. This is a problem that occurs particularly when the dynamic/static surface tension of the ink is low.

For example, in cases in which the compound disclosed in prior art 1, in which a specific quantity of ethylene oxide and/or propylene oxide is added to a straight chain alkanol, is used in order to address such problems, a balance between print density and continuous printing properties cannot be achieved. In addition, by using a surfactant (acetylene glycol), as is the case with the ink disclosed in prior art 4, the decrease in dynamic surface tension is large, and there are concerns that satellites will occur and that the continuous printing properties will deteriorate. Therefore, it is currently the case that conventional inks cannot satisfactorily address the problems mentioned above.

SUMMARY

An ink for an ink jet recording apparatus according to one aspect of the present disclosure is characterized by containing at least water, a pigment dispersion, a penetrant, a non-ionic water-soluble acrylic resin and a surfactant of a compound represented by general formula (I), (II) or (III), wherein the penetrant contains an alkane diol having 8 or 9 carbon atoms, the content of the alkane diol is 0.3 to 1.0 mass % relative to the total mass of the ink, the content of the surfactant is 0.05 to 0.5 mass % relative to the total mass of the ink, the content of the non-ionic water-soluble acrylic resin is 0.05 to 0.5 mass % relative to the total mass of the ink, the non-ionic water-soluble acrylic resin has an average molecular weight of 3000 to 8000 and has a hydrophobic segment, and when the non-ionic water-soluble acrylic resin is added at a quantity of 0.1 mass % relative to 100 mass % of water, the surface tension of the water is 29 to 33 mN/m. [Chemical Formula 1]

(in general formula (I), $R_1$ is $CNH_2N_{+1}$ and may be straight chain or branched chain, N is an integer whereby $7 \leq N \leq 13$, -E-O— is —$CH_2CH_2$—O—, —P—O— is —$CH_2CH$($CH_3$)—O—, n and m are integers whereby $5 \leq n+m \leq 12$ and $n > m$, and repeating sequences consisting of (-E-O—) and (—P—O—) may be in a random pattern or a block pattern)

[Chemical Formula 2]

(in general formula (II), $R_1$ is $C_NH_{2N+1}$ and may be straight chain or branched chain, N is an integer whereby $7 \leq N \leq 13$, -E-O— is —$CH_2CH_2$—O—, —P—O— is —$CH_2CH(CH_3)$—O—, X and Y are integers whereby $5 \leq X+Y \leq 12$ and $X>Y$ (provided that $X=X_1+X_2+\ldots X_n$, and $Y=Y_1+Y_2+\ldots Y_m$),
repeating sequences consisting of (-E-O—) and (—P—O—) may be in a random pattern or a block pattern, and n and m are numbers whereby (-E-O—):(—P—O—) is between 10:3 and 5:1, and are such that $11>n>2$ and $6>m>1$)

[Chemical Formula 3]

(in general formula (III), $R_1$ is $C_{N1}H_{2N1+1}$ and may be straight chain or branched chain, $R_2$ is $C_{N2}H_{2N2+1}$ and may be straight chain or branched chain, N1 and N2 are integers whereby $7 \leq N1+N2 \leq 10$, -E-O— is —$CH_2CH_2$—O—, and n is a number whereby $4 \leq n \leq 12$)

In addition, an image forming method, which is another aspect of the present disclosure, is characterized by forming an image by means of an ink jet recording apparatus that uses the ink for an ink jet recording apparatus.

DETAILED DESCRIPTION

A first embodiment of the present disclosure will now be explained in detail, but the present disclosure is in no way limited to the embodiment below, and can be carried out after appropriate changes within the scope of the objective of the present disclosure. Moreover, in places where explanations would be duplicated, the explanation may be omitted as appropriate, but this does not limit the gist of the disclosure.

[Ink for Ink Jet Recording Apparatus]

The ink for an ink jet recording apparatus (hereinafter also simply referred to as "ink") according to the first embodiment contains at least water, a pigment dispersion, a specific penetrant, a specific non-ionic water-soluble acrylic resin and a surfactant consisting of a compound represented by formula (I), (II) or (III), and contains the penetrant and the surfactant at prescribed quantities relative to the total mass of the ink. The ink of the first embodiment is an ink for an ink jet recording apparatus, exhibits particularly excellent continuous printing properties and print quality, and can suppress the occurrence of effects such as satellites. This is thought to be because an oligomer level non-ionic water-soluble acrylic resin is immobilized at a gas-liquid interface by the non-ionic surfactant represented by formula (I), (II) or (III), thereby enabling both anti-foaming properties and suppression of satellites. The ink of the first embodiment can maintain continuous discharge properties at high temperatures, and is therefore particularly advantageous.

In addition to water, a pigment dispersion, a penetrant, a non-ionic water-soluble acrylic resin and a surfactant consisting of a compound represented by formula (I), (II) or (III), the ink for an ink jet recording apparatus according to the first embodiment may, if necessary, contain a dissolution stabilizer, which stabilizes the dissolved state of the components contained in the ink, and a humectant, which suppresses volatilization of liquid components from the ink and stabilizes the viscosity of the ink. Moreover, the pigment and the resin may be contained as a pigment dispersion in the ink of the present disclosure. Explanations will now be given of the water, pigment dispersion, penetrant, non-ionic water-soluble acrylic resin, surfactant consisting of a compound represented by formula (I), (II) or (III), dissolution stabilizer and humectant, which are contained in the ink for an ink jet recording apparatus as essential or optional components, and of a method for producing the ink for an ink jet recording apparatus.

[Water]

The ink for an ink jet recording apparatus of the first embodiment is a water-based ink, and must contain water. The water contained in the ink can be selected as appropriate according to the desired purity from among types of water used to produce water-based inks in the past. In the ink for an ink jet recording apparatus of the first embodiment, the content of water is not particularly limited. The content of water can be altered as appropriate according to the usage quantities of other components, as mentioned later. The content of water in the ink is preferably 20 to 70 mass %, and more preferably 25 to 60 mass %, relative to the total mass of the ink.

[Pigment Dispersion]

The ink for an ink jet recording apparatus of the first embodiment contains a pigment dispersion, which contains a resin and a pigment that is a coloring agent.

(Pigment)

Pigments able to be contained in the pigment dispersion can be selected as appropriate from among pigments used in the past as coloring agents in inks for ink jet recording apparatuses. Preferred examples of pigments include yellow pigments such as C.I. Pigment Yellow 74, 93, 95, 109, 110, 120, 128, 138, 139, 151, 154, 155, 173, 180, 185 and 193, orange pigments such as C.I. Pigment Orange 34, 36, 43, 61, 63 and 71, red pigments such as C.I. Pigment Red 122 and 202, blue pigments such as C.I. Pigment Blue 15, violet pigments such as C.I. Pigment Violet 19, 23 and 33, and black pigments such as C.I. Pigment Black 7.

The usage quantity of the pigment is preferably 4 to 8 mass % relative to the total mass of the ink. If the usage quantity of the pigment is too low, it is difficult to obtain an image having the desired image density, and if the usage quantity of the pigment is too high, it is difficult to obtain an image having the desired image density due to the fluidity of the ink deteriorating, and penetration of the ink into the recording medium decreases, meaning that image defects caused by offsetting readily occur in formed images.

The volume average particle diameter of the pigment contained in the pigment dispersion is preferably 30 to 200 nm, and more preferably 70 to 130 nm, from perspectives such as color density, hue and stability of the ink. The volume average particle diameter of the pigment can be adjusted by adjusting the particle diameter of beads used when kneading the pigment and the resin or by adjusting the treatment time. The volume average particle diameter of the pigment can be measured with, for example, a dynamic light scattering particle size distribution measurement apparatus (manufactured by Sysmex Corporation), using a sample obtained by diluting the pigment dispersion 300 fold with ion exchanged water.

(Resin)

The resin contained in the pigment dispersion can be selected as appropriate from among a variety of resins used in the past to produce pigment dispersions. Preferred examples of resins include styrene-acrylic acid-alkyl acrylate ester copolymers, styrene-methacrylic acid-alkyl methacrylate ester-alkyl acrylate ester copolymers, styrene-acrylic acid copolymers, styrene-maleic acid copolymers, styrene-maleic acid-alkyl acrylate ester copolymers, styrene-methacrylic acid copolymers, styrene-alkyl methacrylate ester copolymers, styrene-maleic acid half ester copolymers, vinylnaphthalene-acrylic acid copolymers and vinylnaphthalene-maleic acid copolymers. Of these resins, styrene-acrylic acid-based resins which have a unit derived from styrene and a unit derived from acrylic acid, methacrylic acid, acrylic acid esters or methacrylic acid esters, such as styrene-acrylic acid-alkyl acrylate ester copolymers, styrene-methacrylic acid-alkyl methacrylate ester-alkyl acrylate ester copolymers, styrene-acrylic acid copolymers, styrene-maleic acid-alkyl acrylate ester copolymers, styrene-methacrylic acid copolymers, and styrene-methacrylic acid alkyl ester copolymers are preferred due to being easy to prepare and exhibiting an excellent pigment dispersion effect.

The mass average molecular weight (Mw) of the resin used to prepare the pigment dispersion is preferably 10,000 to 160,000. The mass average molecular weight (Mw) of the resin contained in the pigment dispersion can be measured by gel filtration chromatography. The molecular weight of the resin can be adjusted according to a publicly known method by adjusting conditions, such as the usage quantity of a polymerization initiator, the polymerization temperature or the polymerization time, when obtaining the resin by means of a polymerization reaction. The added quantity of a radical polymerization initiator is preferably 0.001 to 5 moles, and more preferably 0.01 to 2 moles, relative to 1 mole of the monomer mixture. However, in cases in which the quantity of initiator is reduced, the polymerization reaction of the reactants can stop and the residual monomer quantity can increase. The polymerization temperature is preferably 60° C.±10° C., and the polymerization time is preferably 10 to 24 hours. In addition, a trace quantity (0.001 moles or less relative to 1 mole of the monomer mixture) of 2-mercaptoethanol can be added as a chain transfer agent.

In addition, the acid value of the resin used to prepare the pigment dispersion is preferably 150 to 300 mg KOH/g. The acid value of the resin can be adjusted by appropriately adjusting the usage quantity of a monomer having an acidic functional group (for example, a carboxy group), such as acrylic acid or methacrylic acid, when synthesizing the resin. Specifically, it is possible to increase the acid value of the resin by increasing the usage quantity of a monomer having an acidic functional group.

The usage quantity of the resin when preparing the pigment dispersion is preferably 15 to 100 parts by mass relative to 100 parts by mass of the pigment.

(Method for Producing Pigment Dispersion)

The method for producing the pigment dispersion that contains a pigment and a resin can be selected as appropriate from among methods known in the past. A preferred method is a method of obtaining a pigment dispersion by kneading a pigment and a resin in an appropriate liquid medium, such as water, by using a media type wet disperser, such as a Nano Grain Mill (manufactured by Asada Iron Works Co., Ltd.), an MSC Mill (manufactured by Mitsui Mining Co., Ltd.) or a Dynomill (manufactured by Shinmaru Enterprises Corporation). Treatment using a media type wet disperser uses small diameter beads. The diameter of the beads is not particularly limited, and is typically 0.5 to 1.0 mm. In addition, the material of the beads is not particularly limited, and a hard material such as zirconia can be used.

The quantity of liquid medium used when producing the pigment dispersion is not particularly limited as long as the pigment and the resin can be thoroughly kneaded. The usage quantity of the liquid medium is preferably 1 to 10 times, and more preferably 2 to 8 times, the total mass of the pigment and the resin.

(Penetrant)

The ink for an ink jet recording apparatus of the first embodiment contains a penetrant in order to enhance penetration of the ink into a recording medium. The penetrant is an alkane diol having 8 or 9 carbon atoms. If the ink contains an alkane diol having 8 or 9 carbon atoms as a penetrant, it is possible to form circular dots having the desired diameters and form an image having the desired image density.

However, in cases in which an alkane diol having 7 or fewer carbon atoms is used as the penetrant, it is difficult to obtain an ink having excellent penetration into a recording medium, meaning that it is difficult to form circular dots having the desired diameters and difficult to form an image having the desired image density. In addition, in cases in which the number of carbon atoms in the alkane diol is 10 or more, the water solubility of the alkane diol is significantly reduced, meaning that it is difficult to prepare an ink that is homogeneously blended.

The content of the alkane diol having 8 or 9 carbon atoms in the ink is 0.3 to 0.5 mass %. If the content of the alkane diol having 8 or 9 carbon atoms in the ink is to low, penetration of the ink into a recording medium tends to be reduced. In such cases, it is difficult to form dots that are nearly circular. If the ink hardly penetrates into the recording medium, ink landing on the recording medium penetrates into the recording medium while flowing irregularly on the recording medium, meaning that irregularly shaped dots are formed. In addition, if penetration of the ink into the recording medium is low, it is difficult to form an image having the desired image density. In such cases, offsetting readily occurs and some of the ink on the recording medium is transferred to the discharge rollers, meaning that the density of the formed image tends to be reduced.

Meanwhile, if the content of the alkane diol having 8 or 9 carbon atoms in the ink is too high, penetration of the ink into a recording medium is excessively high, meaning that ink landing on the recording medium rapidly penetrates into the recording medium and the diameters of formed dots tend to be reduced. In addition, in cases in which penetration of the ink into the recording medium is too high, the pigment contained in the ink also penetrates into the recording medium, meaning that it is difficult to form an image having the desired image density.

The alkane diol is not particularly limited as long as the number of carbon atoms therein is 8 or 9, and may be a straight chain or branched chain alkane diol. Specific examples of alkane diols include 1,2-octane diol, 1,2-nonane diol, 2-ethyl-1,3-hexane diol, 2-butyl-2-ethyl-1,3-propane diol, 2,2,4-trimethyl-1,3-pentane diol and 2,4-diethyl-1,5-pentane diol. Of these alkane diols, one or more compounds selected from the group consisting of 1,2-octane diol, 2-ethyl-1,3-hexane diol, 2-butyl-2-ethyl-1,3-propane diol, 2,2,4-trimethyl-1,3-pentane diol and 2,4-diethyl-1,5-pentane diol are preferred. It is thought that by using these alkane diols, the above-mentioned ink can more reliably penetrate into a recording medium. Moreover, it is possible to use a combination of two or more of these alkane diols.

In addition, the penetrant used in the first embodiment can be a combination of an alkane diol having 8 or 9 carbon atoms and a variety of organic solvent used in the past in order to improve the penetration of inks for ink jet recording apparatuses. Specific examples of organic solvents able to be used in combination with the alkane diol having 8 or 9 carbon atoms include alkane diols having 7 or fewer carbon atoms, such as 1,2-hexylene glycol, alkylene glycol monoalkyl ethers, dialkylene glycol monoalkyl ethers, trialkylene glycol monoalkyl ethers and cyclic ketone compounds. In cases in which the alkane diol having 8 or 9 carbon atoms is used in combination with another penetrant, the total usage quantity of the penetrant is greater than 0.3 mass %, preferably 1 to 20 mass %, and more preferably 5 to 15 mass %, relative to the total mass of the ink.

[Non-Ionic Water-Soluble Acrylic Resin]

The non-ionic water-soluble acrylic resin used in the first embodiment is characterized by having an average molecular weight of 3000 to 8000, by having a hydrophobic segment, and in that when the non-ionic water-soluble acrylic resin is added at a quantity of 0.1 mass % relative to 100 mass % of water, the surface tension of the water is 29 to 33 mN/m.

By using this type of non-ionic water-soluble acrylic resin in combination with the surfactant described later, it is possible to achieve excellent continuous printing properties and print quality (print density) and possible to suppress the occurrence of defects such as satellites.

If the average molecular weight of the resin is lower than 3000, there are concerns that the print density will be lower than the desired value, and if the average molecular weight of the resin exceeds 8000, there are concerns that the problem of satellites will occur.

In addition, if the surface tension is lower than 29 mN/m, there are concerns that the print density will be lower than the desired value, and if the surface tension exceeds 33 mN/m, there are concerns that it would not be possible to achieve continuous printing properties.

The non-ionic water-soluble acrylic resin is not particularly limited as long as the characteristics mentioned above are satisfied. Specifically, it is possible to use, for example, an acrylic resin obtained by appropriately polymerizing poly (ethylene glycol) acrylate (PEGA), methyl methacrylate (MMA), methyl acrylate (MA), ethyl acrylate (EA), ethyl methacrylate (EMA) or the like, which are hydrophilic segments, and stearyl acrylate (SA), benzyl acrylate or benzyl methacrylate, which are hydrophobic segments. It is possible to adjust the surface tension by selecting the blending proportions and types of the hydrophilic segments and/or hydrophobic segments used or by adjusting the average molecular weight of the non-ionic water-soluble acrylic resin.

The content of the non-ionic water-soluble acrylic resin is 0.05 to 0.5 mass % relative to the total mass of the ink. If the content of the non-ionic water-soluble acrylic resin in the ink is too low, the wettability of the paper is reduced, meaning that absorption is reduced, leading to concerns that the print density of the formed image would be reduced. Meanwhile, if the content of the non-ionic water-soluble acrylic resin in the ink is too high, excessive strike-through occurs, meaning that the print density of the formed image is reduced, and there are concerns regarding the occurrence of satellites.

[Surfactant]

The ink for an ink jet recording apparatus according to the first embodiment contains a surfactant consisting of a compound represented by general formula (I), (II) or (III) below. It is possible to use a combination of compounds represented by general formulae (I) to (III) below as the surfactant.

[Chemical Formula 4]

(I)

(in general formula (I), $R_1$ is $CNH_{2N+1}$ and may be straight chain or branched chain, N is an integer whereby $7 \leq N \leq 13$, -E-O— is —$CH_2CH_2$—O—, —P—O— is —$CH_2CH(CH_3)$—O—, n and m are integers whereby $5 \leq n+m \leq 12$ and n>m, and repeating sequences consisting of (-E-O—) and (—P—O—) may be in a random pattern or a block pattern)

[Chemical Formula 5]

(II)

(in general formula (II), $R_1$ is $CNH_{2N+1}$ and may be straight chain or branched chain, N is an integer whereby $7 \leq N \leq 13$, -E-O— is —$CH_2CH_2$—O—, —P—O— is —$CH_2CH(CH_3)$—O—, X and Y are integers whereby $5 \leq X+Y \leq 12$ and X>Y (provided that $X=X_1+X_2+ \ldots X_n$, and $Y=Y_1+Y_2+ \ldots Y_m$), repeating sequences consisting of (-E-O—) and (—P—O—) may be in a random pattern or a block pattern, and n and m are numbers whereby (-E-O—):(—P—O—) is between 10:3 and 5:1, and are such that 11>n>2 and 6>m>1)

[Chemical Formula 6]

(III)

(in general formula (III), $R_1$ is $C_{N1}H_{2N1+1}$ and may be straight chain or branched chain, $R_2$ is $C_{N2}H_{2N2+1}$ and may be straight chain or branched chain, N1 and N2 are integers whereby $7 \leq N1+N2 \leq 10$, -E-O— is —CH2CH2—O—, and n is a number whereby $4 \leq n \leq 12$).

By incorporating a surfactant consisting of a compound represented by general formula (I), (II) or (III) in the ink, wettability of a recording medium by the ink is improved and thus the ink penetrates into the recording medium easily. Since the ink can readily penetrate into the recording medium, the ink of the first embodiment can form an image having excellent quality and the desired print density.

In general formulae (I) and (II), N is an integer between 7 and 13. In cases in which N is an integer between 7 and 13, compounds represented by formulae (I) and (II) have an appropriate water solubility, meaning that it is easy to prepare an ink that is homogeneously blended. Furthermore, it is possible to satisfactorily discharge ink droplets from a recording head filled with the ink when forming an image after leaving the recording head to stand uncapped for a long period of time.

In general formula (I), the value of n+m is an integer that is not lower than 5 and not higher than 12, and is preferably 5 to 11. If the value of n+m is lower than 5, the print density of the formed image will be lower than the desired value, and if the value of n+m exceeds 12, there are concerns that the print density of the formed image will be lower than the desired value.

In addition, n and m are not particularly limited as long as n and m are numbers, n+m=5 to 12 and m<n, but n is preferably 2 to 12, and more preferably 3 to 10. In addition, m is preferably 1 to 6, and more preferably 2 to 5. Moreover, in cases in which n≤m, the surface tension of the ink is significantly reduced, which is not desirable.

In general formula (II), X represents the sum of X1+X2+ . . . Xn, and Y represents the sum of Y1+Y2+ . . . Ym. X+Y is an integer that is not lower than 5 and not higher than 12, is preferably 5 to 12, and is more preferably 6 to 11. In cases in which the value of X+Y is lower than 5, continuous printing properties deteriorate, and in cases in which the value of X+Y exceeds 12, there are concerns that the print density of a formed image will be lower than the desired value.

In addition, X and Y are not particularly limited as long as X and Y are positive numbers, X+Y=5 to 12 and Y<X, but X is preferably 2 to 12, and more preferably 3 to 10. In addition, Y is preferably 1 to 6, and more preferably 2 to 5. Moreover, in cases in which Y≤X, miscibility with water does not occur, which is not desirable.

In general formula (II), n and m numbers whereby (-E-O—):(—P—O—) is between 10:3 and 5:1, 11>n>2, and 6>m>1. Within such ranges, continuous discharge properties and print density are excellent and it is possible to suppress the occurrence of satellites.

Moreover, in general formulae (I) and (II), ethylene oxide (EO) and propylene oxide (PO) are repeating units, and block polymerization is preferred in in formula (I) and random polymerization is preferred in formula (II).

In general formula (III), the value of N1+N2 is an integer between 7 and 10. In cases in which the value of N1+N2 is an integer between 7 and 10, a compound represented by formula (III) has an appropriate water solubility, meaning that it is easy to prepare an ink that is homogeneously blended. In addition, it is possible to satisfactorily discharge ink droplets from a recording head filled with the ink when forming an image after leaving the recording head to stand uncapped for a long period of time.

In addition, N1 and N2 are not particularly limited as long as N1 and N2 are positive numbers and N1+N2=7 to 10, but N1 is preferably 3 to 6 and N2 is preferably 3 to 6.

In general formula (III), n is an integer that is not lower than 4 and not higher than 12. In cases in which n is lower than 4, there are concerns that the print density of a formed image will be lower than the desired value and that satellites will occur, and in cases in which n exceeds 12, there are concerns that continuous printing properties cannot be achieved.

In the first embodiment, the content of the surfactant in the ink is 0.05 to 0.5 mass % relative to the total mass of the ink. If the content of the surfactant in the ink is too low, anti-foaming properties are reduced, meaning that there are concerns that continuous discharge properties cannot be achieved. However, if the content of the surfactant in the ink is too high, the surface tension becomes too low, meaning that there are concerns regarding the occurrence of satellites.

Methods for producing the compounds represented by general formulae (I), (II) and (III) are not particularly limited, but a compound represented by general formula (I), for example, can be produced by adding ethylene oxide and propylene oxide to the hydroxyl group in the alcohol represented by general formula (IV) below using a conventional method.

[Chemical Formula 7]

(IV)

$$R^1-\underset{\underset{R^2}{|}}{CH}-OH$$

In addition, a compound represented by general formula (II) can be produced by further carrying out random addition polymerization of ethylene oxide and propylene oxide in the method mentioned above for producing a compound represented by formula (I).

In addition, a compound represented by general formula (III) can be produced by carrying out arbitrary addition polymerization of propylene oxide to the alcohol represented by formula (IV) above and then carrying out an addition reaction of the alcohol represented by formula (IV) to the terminals of the obtained polymer.

[Dissolution Stabilizer]

The dissolution stabilizer is a component that stabilizes the dissolved state of the ink by compatibilizing the components contained in the ink. Specific examples of dissolution stabilizers include 2-pyrrolidone, N-methyl-2-pyrrolidone and γ-butyrolactone. It is possible to use a combination of two or more of these dissolution stabilizers. In cases in which the ink contains a dissolution stabilizer, the content of the dissolution stabilizer is preferably 1 to 20 mass %, and more preferably 3 to 15 mass %, relative to the total mass of the ink.

[Humectant]

The humectant is a component that stabilizes the viscosity of the ink by suppressing volatilization of liquid components from the ink. Specific examples of humectants include poly (alkylene glycols) such as poly(ethylene glycol) and polypropylene glycol); alkylene glycols such as ethylene glycol, propylene glycol, butylene glycol, di(ethylene glycol), di(propylene glycol), tri(ethylene glycol), tri(propylene glycol), 1,2,6-hexane triol, thiodiglycol, 1,3-butane diol and 1,5-pentane diol; and glycerin. Of these humectants, glycerin is more preferred due to exhibiting an excellent effect in terms of suppressing volatilization of liquid components such as water. It is possible to use a combination of two or more of these humectants. In cases in which the ink contains a humectant, the content of the humectant is preferably 2 to 30 mass %, and more preferably 10 to 25 mass %, relative to the total mass of the ink.

[Method for Producing Ink for Ink Jet Recording Apparatus]

The method for producing the ink is not particularly limited as long as a dissolution stabilizer and a humectant are added, if necessary, to water, a pigment dispersion, a penetrant, a non-ionic water-soluble acrylic resin and a surfactant consisting of a compound represented by formula (I), (II) or (III), and these ink components can be homogeneously blended. A specific example of a method for producing the ink for an ink jet recording apparatus is a method of homogeneously blending the ink components in a mixer and then removing contaminants and coarse particles by means of a filter having a hole diameter of 10 μm or lower. Moreover, when producing the ink for an ink jet recording apparatus, a variety of additives added in the past to inks for ink jet recording apparatuses, for example organic solvents such as dissolution stabilizers, other liquid components, anti-oxidants, viscosity modifiers, pH adjusting agents and antiseptic mildewproofing agents, can be added if required to the water, pigment dispersion, humectant, penetrant, non-ionic water-soluble acrylic resin and surfactant consisting of a compound represented by formula (I), (II) or (III). In addition, it is possible to add another surfactant other than compounds represented by formulae (I) to (III) to the ink of the first embodiment.

The ink for an ink jet recording apparatus according to the first embodiment, as described above, can be advantageously used in a variety of ink jet recording apparatuses.

[Image Forming Method]

Next, an explanation will be given of an image forming method in which an image is formed by means of an ink jet recording apparatus that uses the ink for an ink jet recording apparatus according to the first embodiment. The recording method of the ink jet recording apparatus used in the image forming method of the second embodiment is not particularly limited, and may be a serial method, in which a recording head records an image while sweeping across a recording medium, or a line head method, in which recording is carried out by a recording head fixed to the main body of the apparatus. The ink jet recording apparatus used in the image forming method according to the second embodiment is preferably a recording apparatus provided with a line head type recording head from the perspective of forming an image at high speed, and is more preferably a recording apparatus provided with a long line head aligned in a direction that is perpendicular to the direction in which the recording medium is transported.

Figure 1:
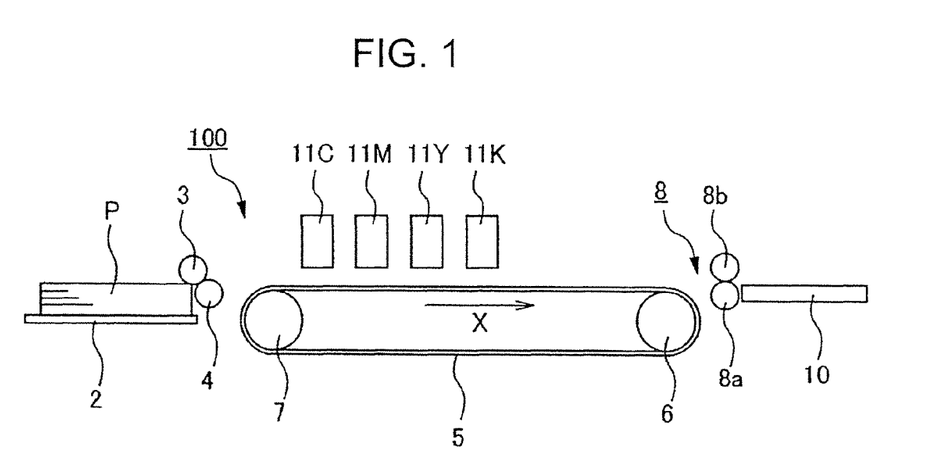
FIG. 1 is a diagram showing the constitution of an ink jet recording apparatus that uses a line head type recording method.
Figure 2:
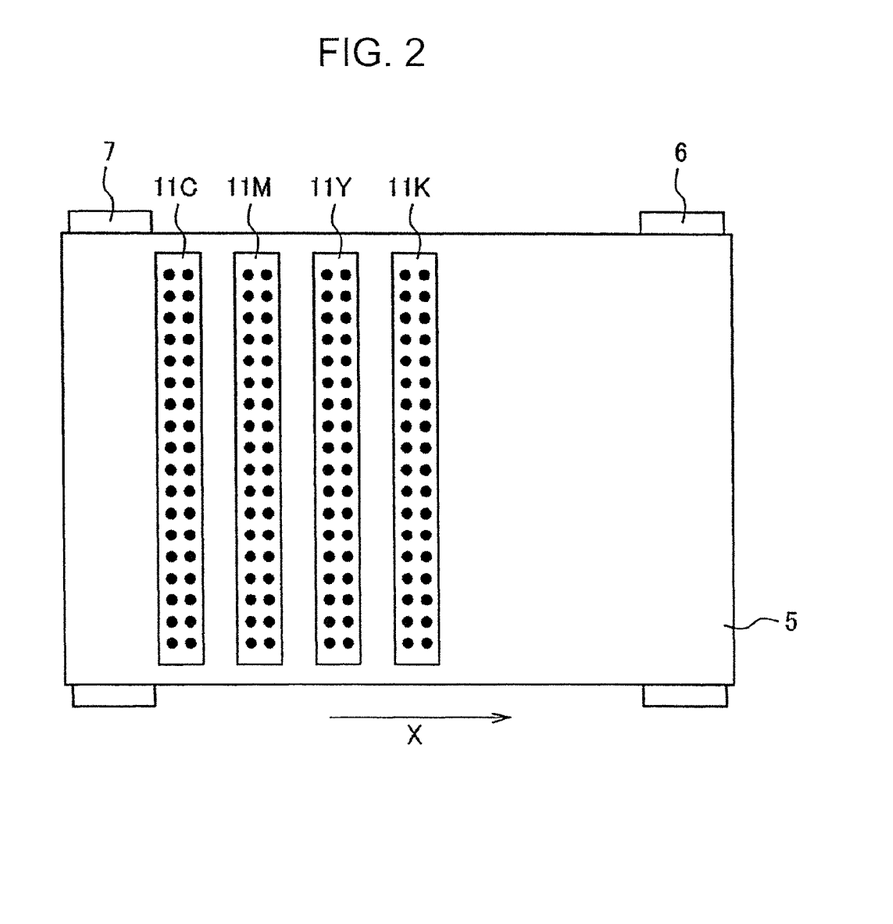
FIG. 2 is a diagram showing the transport belt of the ink jet recording apparatus shown in FIG. 1, as seen from above.

With reference to the drawings, the image forming method of the second embodiment will now be explained by illustrating a case in which an ink jet recording apparatus that uses a line head type recording method is used and a recording paper P is used as the recording medium. FIG. 1 is a diagram showing the constitution of an ink jet recording apparatus that uses a line head type recording method, and FIG. 2 is a diagram showing the transport belt of the ink jet recording apparatus shown in FIG. 1, as seen from above.

As shown in FIG. 1, a paper supply tray 2 (a paper supply section) that houses the recording paper P is provided on the left hand side of an ink jet recording apparatus 100, and a paper supply roller 3, which is used to supply and transport the housed recording paper P one sheet at a time from the top of the paper pile to a transport belt 5, and a driven roller 4, which is pressed against the paper supply roller 3 and is driven to rotate by the paper supply roller 3, are provided at one edge of this paper supply tray 2.

The transport belt 5 is provided in such a way as to be able to rotate in the direction of paper transport X on the downstream side of the paper supply roller 3 and drive roller 4 (on the right hand side in FIG. 1). The transport belt 5 is stretched around a belt drive roller 6, which is provided on the downstream side in the direction of paper transport X, and a belt roller 7, which is provided on the upstream side in the direction of paper transport and which is driven to rotate by the belt drive roller 6 via the transport belt 5, and the recording paper P is transported in the direction indicated by the arrow X as a result of the belt drive roller 6 being driven to rotate in a clockwise direction.

The ink jet recording apparatus 100 may be provided with a heating section (not shown) that heats the recording medium in order to facilitate ink drying. However, because the ink of the first embodiment, which exhibits excellent penetration into the recording medium, is used in the second embodiment, the ink rapidly dries on the recording medium and a good image can be formed without the recording medium being heated. Therefore, the ink jet recording apparatus 100 does not necessarily require a heating section.

In addition, a pair of discharge rollers 8 (a discharge section) consisting of a discharge roller 8a, which is driven in a clockwise direction in the diagram and discharges the recording paper P, on which an image has been recorded, to outside the main body of the apparatus, and a driven roller 8b, which is pressed against the upper part of the discharge roller 8a and is driven to rotate by the discharge roller 8a, is provided on the downstream side of the transport belt 5 in the direction of paper transport X. A discharged paper tray 10, in which the recording paper P discharged from the main body of the apparatus accumulates, is provided on the downstream side of the pair of discharge rollers 8 in the direction of paper transport X.

Because the driven roller 8b comes into direct contact with the surface of the recording paper P on which an image has been formed, it is preferable for the material that forms the surface of the driven roller 8b to be a water-repellent material. By forming the surface of the drive roller 8b from a water-repellent material, ink that has not penetrated into the recording paper P can be prevented from adhering to the roller, meaning that it is easy to suppress the occurrence of offsetting. Preferred water-repellent materials include fluororesins such as polytetrafluoroethylene (PTFE), tetrafluoroethylene-perfluoroalkyl vinyl ether copolymers, tetrafluoroethylene-hexafluoropropylene copolymers, tetrafluoroethylene-ethylene copolymers, tetrafluoroethylene-vinylidene fluoride copolymers, tetrafluoroethylene-hexafluoropropylene-perfluoroalkyl vinyl ether copolymers, poly(chlorotrifluoroethylene), chlorotrifluoroethylene-ethylene copolymers, chlorotrifluoroethylene-vinylidene fluoride copolymers, poly(vinylidene fluoride) and poly(vinyl fluoride). Like the drive roller 8b, it is preferable for the surface of those components that come into contact with the surface of the recording paper P, on which an image has been formed, to be formed from water-repellent materials.

In addition, line heads 11C, 11M, 11Y and 11K, which are held at a height whereby a prescribed gap is formed between the line heads and the upper surface of the transport belt 5 and which record an image on the recording paper P being transported on the transport belt 5, are provided above the transport belt. These line heads 11C to 11K are filled with 4 differently colored inks (cyan, magenta, yellow and black), and by discharging these colored inks from the line heads 11C to 11K, a colored image is formed on the recording paper P.

After ink droplets discharged from the line heads 11C to 11K land on the recording paper P, it is preferable for the time within which those parts of the recording paper P on which ink has landed reach the discharge section 8 to be within 1 second in order to be able to reduce the size of the apparatus. Even if this time is within 1 second, by using the ink according to the first embodiment, it is possible to achieve a satisfactory effect in terms of preventing the occurrence of offsetting when forming an image at high speed.

In addition, the quantity of a single color of ink or a plurality of colors of ink discharged from the line heads 11C to 11K to the recording paper P and driven into the recording paper P is not particularly limited, and an image can be formed by adjusting to a quantity whereby an image having the desired image density can be formed and offsetting hardly occurs.

As shown in FIG. 2, each of these line heads 11C to 11K is provided with an array of nozzles in which a plurality of nozzles are aligned in a direction that is perpendicular to the direction of travel of the recording paper P (the vertical direction as shown in FIG. 2), has a recording region that has at least the width of the recording paper P being transported, and can collectively form a single line image on the recording paper P being transported on the transport belt 5.

Moreover, by arranging a plurality of nozzles in the longitudinal direction of a long head body formed so as to have a width that is greater than the width of the transport belt 5 of the ink jet recording apparatus that uses a line head type recording method, a line head constituted so as to have a recording region that has at least the width of the recording paper P is used, but it is also possible to use a line head able to record an image across the entire width of the recording paper P being transported by providing a plurality of short head units, each having a plurality of nozzles, in the width direction of the transport belt 5.

In addition, the method for discharging ink from the line heads 11C to 11K can be a variety of methods, such as a piezoelectric element type method, in which ink droplets are discharged by utilizing the pressure generated in the liquid chambers in the line heads 11C to 11K by using piezoelectric elements (not shown), or a thermal ink jet method, in which ink is discharged by generating bubbles in the ink by means of a heating element, thereby applying pressure to the ink. The method for discharging the ink is preferably a piezoelectric element method due to the ease of controlling the quantity of ink discharged.

Figure 3:
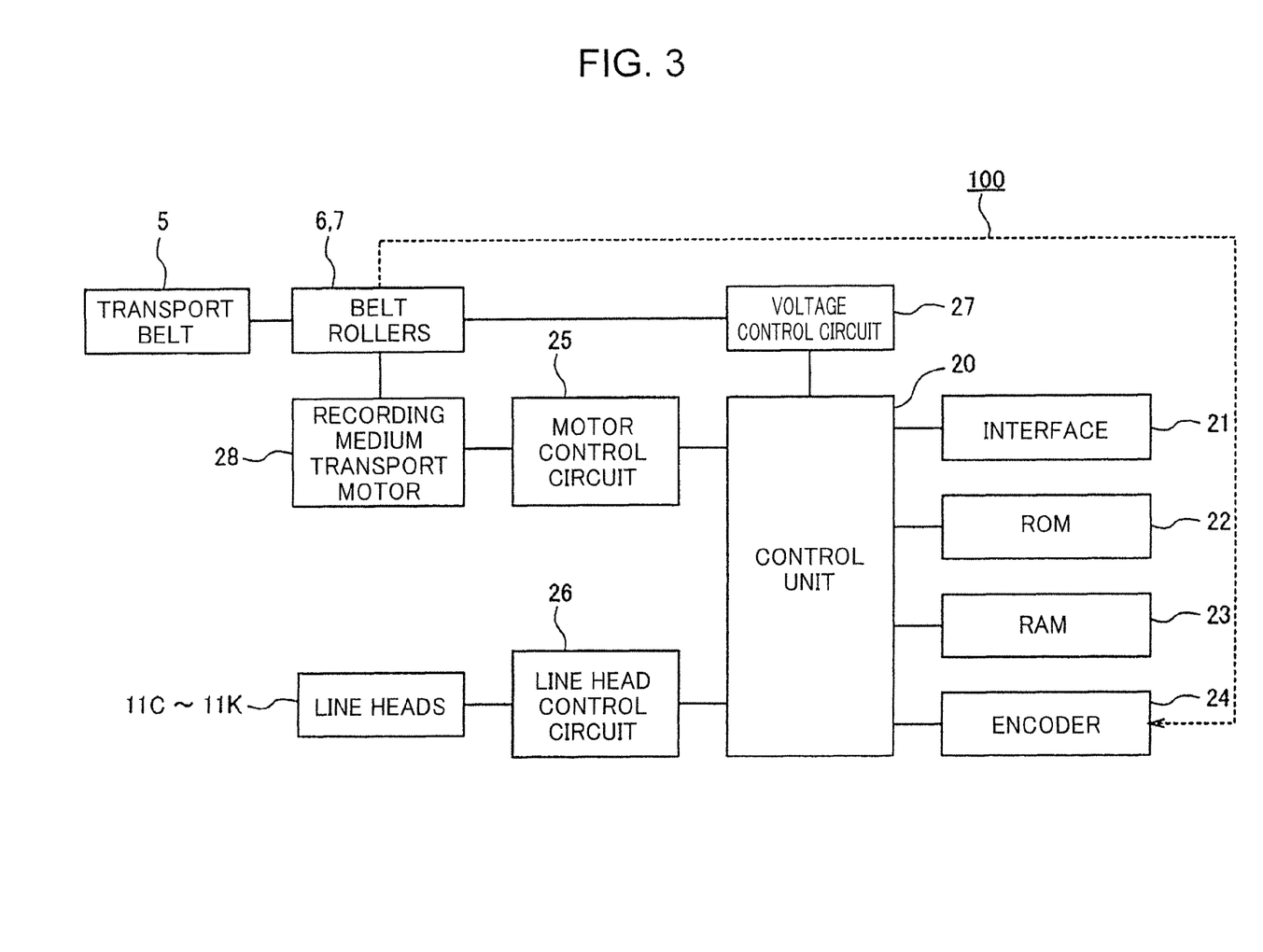
FIG. 3 is a block diagram showing the constitution of an ink jet recording apparatus that uses a line head type recording method.

FIG. 3 is a block diagram showing the constitution of an ink jet recording apparatus that uses a line head type recording method. Those parts that are also shown in FIG. 1 and FIG. 2 are given the same numerals, and the explanations of these parts are omitted here. The ink jet recording apparatus 100 is provided with a control unit 20, and the control unit 20 is connected to an interface 21, a ROM 22, a RAM 23, an encoder 24, a motor control circuit 25, a line head control circuit 26, a voltage control circuit 27, and so on.

The interface 21 sends data to, and receives data from, a host device such as a personal computer (not shown), for example. The control unit 20 subjects image signals received via the interface 21 to magnification processing or gradation processing if necessary, thereby converting the image signals into image data. In addition, the control unit 20 outputs control signals to a variety of control circuits, which are described later.

The ROM 22 stores control programs and so on that are used when image recording is carried out by driving the line heads 11C to 11K. The RAM 23 stores image data, which has been subjected to magnification processing or gradation processing by the control unit 20, in a prescribed area.

The encoder 24 is connected to the belt drive roller 6 in the paper discharge side, which drives the transport belt 5, and outputs a pulsed stream according to the degree of rotary displacement of the rotation axis of the belt drive roller 6. The control unit 20 calculates the degree of rotation of the belt drive roller 6 by counting the number of pulses transmitted from the encoder 24 and determines the feed amount of the recording paper P (the position of the paper). In addition, the control unit 20 outputs control signals to the motor control circuit 25 and line head control circuit 26 on the basis of signals from the encoder 24.

The motor control circuit 25 drives a recording medium transport motor 28 according to signals outputted by the control unit 20. Because the recording medium transport motor 28 rotates to drive the belt drive roller 6, the transport belt 5 is rotated in a clockwise direction as shown in FIG. 1, thereby transporting the recording paper P in the direction indicated by the arrow X.

The line head control circuit 26 transmits image data stored in the RAM 23 to the line heads 11C to 11K on the basis of signals outputted by the control unit 20, and controls the discharge of ink from the line heads 11C to 11K on the basis of the transmitted image data. By controlling in this way and controlling the transport of the recording paper P by the transport belt 5 that is driven by the recording medium transport motor 28, an image is formed on the recording paper P.

The voltage control circuit 27 generates an alternating electric field by applying a voltage to the belt roller 7 on the paper supply side according to signals outputted by the control unit 20, and makes the recording paper P electrostatically absorb on the transport belt 5. The electrostatic charge is eliminated by earthing the belt roller 7 or belt drive roller 6 according to signals outputted by the control unit 20.

Figure 4:
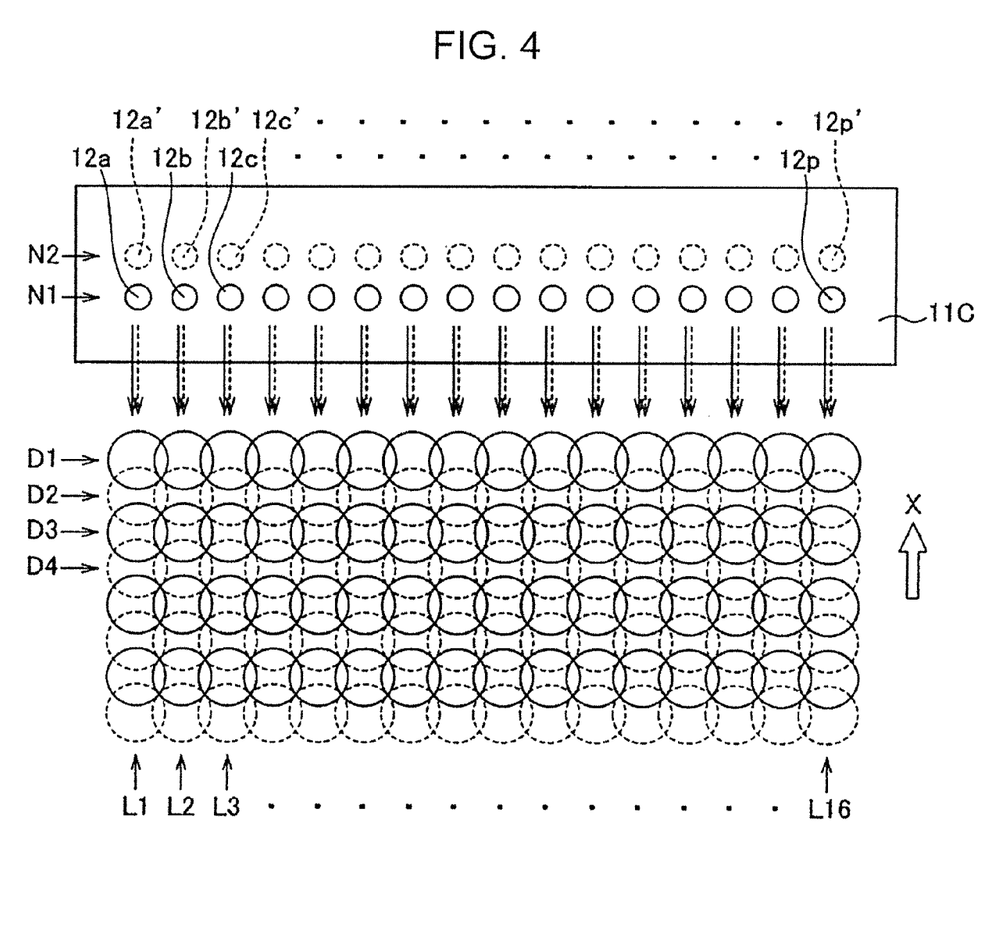
FIG. 4 is a diagram showing a line head used in an ink jet recording apparatus that uses a line head type recording method, and a part of a dot row formed on a recording paper.

With reference to FIG. 4, a detailed explanation will now be given of a method for forming a dot by using the ink jet recording apparatus that uses a line head type recording method. Moreover, of the line heads 11C to 11K shown in FIG. 1 and FIG. 2, an explanation will be given using the line head 11C in FIG. 4, but this explanation would be exactly the same for the other line heads 11M to 11K.

As shown in FIG. 4, nozzle arrays N1 and N2 each consisting of a plurality of nozzles are aligned in the direction of transport of the recording paper P (the direction indicated by the arrow X) in the line head 11C. That is, a total of two nozzles, one each in the nozzle arrays N1 and N2 (for example, nozzles 12*a* and 12*a*' in dot row L1) are provided as nozzles that form each dot row in the direction of transport of the recording paper P. Moreover, in order to simplify the explanation, of the nozzles that constitute the nozzle arrays N1 and N2, only the 16 nozzles each for 12*a* to 12*p* and 12*a*' to 12*p*', which correspond to dot rows L1 to L16, are shown, but in fact, a greater number of nozzles are aligned in a direction perpendicular to the direction of transport of the recording paper P.

In addition, an image is formed on the recording paper P, which is the recording medium, by using these nozzle arrays N1 and N2 in that order. For example, while the recording paper P is moved in the direction of transport of the recording paper P, a single line dot row D1 is formed in the width direction of the recording paper P (left to right as shown in the diagram) by the discharge of ink from the nozzle array N1 (the solid arrows in the diagram), a single line dot row D2 is then formed by the discharge of ink from the nozzle array N2 (the dashed arrows in the diagram), and a single line dot row D3 is formed by the discharge of ink from the nozzle array N1 again. Thereafter, dot rows (D4 and subsequent dot rows) are formed in the same way by alternately using the nozzle arrays N1 and N2.

According to the image forming method of the second embodiment, as described above, it is possible to form circular dots having the desired diameters and possible to form an image having the desired density. As a result, the image forming method according to the second embodiment can be advantageously used in a variety of ink jet recording apparatuses.

EXAMPLES

The present disclosure will now be explained in greater detail through the use of examples. Moreover, the present disclosure is in no way limited to the examples.

Production Example 1

Production of Styrene-Acrylic Resin

A styrene-acrylic resin, which was to be used to prepare a pigment dispersion, was produced according to the following procedure.

A stirrer, a nitrogen inlet tube, a condenser and a dropping funnel were attached to a four-mouthed flask having a capacity of 1000 mL, and 100 g of isopropyl alcohol and 300 g of methyl ethyl ketone were added to the flask and heated to reflux while bubbling nitrogen gas. A solution obtained by mixing and dissolving 40 g of methyl methacrylate, 40 g of styrene, 10 g of butyl acrylate, 10 g of methacrylic acid and 0.4 g of azobisisobutyronitrile (AIBN) as an initiator was placed in the dropping funnel, and added dropwise to the flask while being heated to reflux at 70° C. over a period of approximately 2 hours. Following this dropwise addition, heating to reflux was carried out for a further 6 hours, and a methyl ethyl ketone solution containing 0.2 g of AIBN was added dropwise over a period of 15 minutes. Heating to reflux was carried out for a further 5 hours, thereby obtaining a styrene-acrylic resin having a molecular weight of 20,000. The mass average molecular weight (Mw) of the obtained styrene-acrylic resin was measured using gel filtration chromatography (using a HLC-8020 GPC (manufactured by Tosoh Corporation)) under the conditions described below. In addition, the acid value of the obtained resin was confirmed by titration, and found to be 100 mg KOH/g.

<Mass Average Molecular Weight Measurement Conditions>

Column: TSK gel, Super Multipore HZ-H (manufactured by Tosoh Corporation, 4.6 mm ID×15 cm)
Number of columns: 3
Eluant: Tetrahydrofuran
Flow rate: 0.35 ml/min
Sample injection quantity: 10 μL
Measurement temperature: 40° C.
Detector: IR detector Calibration curves were prepared by selecting 8 materials, namely F-40, F-20, F-4, F-1, A-5000, A-2500, A-1000 and n-propylbenzene, from among standard reference materials (TSK standard polystyrene, manufactured by Tosoh Corporation).

Production Example 2

Production of Pigment Dispersion

Phthalocyanine Blue 15:3 (FG-7330, manufactured by Toyo Ink Co., Ltd.) was used as a cyan pigment. 15 mass % of the pigment, 6.0 mass % of the styrene-acrylic resin obtained in Production Example 1 and 0.2 mass % of 1,2-octane diol, each relative to the total mass of the materials used to prepare the pigment dispersion, and water (ion exchanged water) (balance) were placed in a Dynomill (Multi-lab model, vessel capacity 0.6 L (manufactured by Shinmaru Enterprises Corporation)). Next, potassium hydroxide was added to the Dynomill at a quantity required to neutralize the styrene-acrylic resin. Zirconia beads having diameters of 0.5 mm were placed as a medium in the Dynomill so as to occupy 70% of the vessel capacity, and the pigment and the styrene-acrylic resin were kneaded at a temperature of 10° C. and a peripheral speed of 8 m/s while being cooled by water. Moreover, the resin A was neutralized with an aqueous solution containing NaOH at a quantity corresponding to 105% of the neutralization equivalent quantity. In addition, the mass of Na was calculated as the mass of the resin, and the mass of water contained in the aqueous solution of NaOH and water generated by the neutralization reaction was calculated as the mass of ion exchanged water. The obtained pigment dispersion was diluted 300 fold with ion exchanged water, the volume average particle diameter D50 of the pigment was measured using a dynamic light scattering particle size distribution measurement apparatus (Zetasizer Nano, manufactured by Sysmex Corporation), and it was confirmed that the volume average particle diameter of the pigment fell within the range 70 to 130 nm.

Production Example 3

Non-Ionic Water-Soluble Acrylic Resin C

A stirrer, a nitrogen inlet tube, a condenser and a dropping funnel were attached to a four-mouthed flask having a capacity of 1000 mL, and 100 parts by mass of isopropyl alcohol and 300 parts by mass of methyl ethyl ketone were added to the flask and heated to reflux while bubbling nitrogen gas. A solution obtained by mixing and dissolving 60 parts by mass of poly(ethylene glycol) acrylate (PEGA), 15 parts by mass of butyl acrylate (BA), 15 parts by mass of lauryl acrylate (LA), 10 parts by mass of methyl methacrylate (MMA) and 0.4 g of azobisisobutyronitrile (AIBN) as an initiator was placed in the dropping funnel and added dropwise to the flask while being heated to reflux at 70° C. over a period of approximately 2 hours. Following this dropwise addition, heating to reflux was carried out for a further 6 hours, and a methyl ethyl ketone solution containing 0.2 g of AIBN was added dropwise over a period of 15 minutes. Heating to reflux was carried out for a further 5 hours, thereby obtaining a non-ionic water-soluble acrylic resin C.

The obtained resin was added at a quantity of 0.1 mass % relative to 100 mass % of water, and the surface tension was then measured and found to be 30.6 mN/m. In addition, the molecular weight of the obtained resin was 4000.

Examples 1 to 4 and Comparative Examples 1 and 2

In Examples 1 to 4 and Comparative Examples 1 and 2, different inks were prepared by altering only the type of surfactant contained in composition 1 (see Table 1). Specifically, the inks of Examples 1 to 4 and Comparative Examples 1 and 2 were obtained by homogeneously mixing the materials of composition 1 by using a stirrer (three-one motor type, BL-600 (manufactured by As One Corporation) at a rotational speed of 400 rpm, and then filtering with a filter having a pore diameter of 5 μm.

(Composition 1)
Pigment dispersion obtained in Production Example 2: 40 mass %
Tri(ethylene glycol) monobutyl ether: 4.5 mass %
2-pyrrolidone (dissolution stabilizer): 5.0 mass %
Surfactants 1 to 6: 0.4 mass %
Non-ionic water-soluble acrylic resin C obtained in Production Example 3: 0.4 mass % 1,2-octane diol: 0.6 mass %
Glycerin: 15 mass %
1,3-propane diol: 15 mass %
Ion exchanged water: balance In addition, the inks of Examples 1 to 4 and Comparative Examples 1 and 2 were evaluated in terms of continuous discharge properties (at room temperature and 40° C.), print density and presence/absence of satellites, using the following evaluation methods. These results are shown in table 1 below.

<Continuous Discharge Properties>

Continuous discharge properties was evaluated by using an image forming apparatus (a tester manufactured by Kyocera Document Solutions) as an evaluation apparatus, and in addition to a conventional room temperature test, this evaluation involved increasing the head temperature to 40° C. and then discharging ink at this temperature. A solid image (a band-like image obtained by using all the nozzles) was printed on a paper at the width of the paper in the direction perpendicular to the direction of paper transport in such a way that the print rate was 5%, and 1 hour thereafter, it was confirmed whether or not ink could be discharged from all the nozzles by printing a nozzle check pattern (1 nozzle: 8 pL, printing speed, driving frequency: 20 kHz). Cases in which non-discharge and jetting twisting (landing position misalignment) did not occur were evaluated as "good", and cases in which non-discharge and/or jetting twisting were confirmed in even one nozzle were evaluated as "fail".

<Print Density>

Print density was evaluated by using an image forming apparatus (a tester manufactured by Kyocera Document Solutions) as an evaluation apparatus, and involved evaluating the image density of a solid image formed at a temperature of 25° C. and a relative humidity of 60%. Using ordinary paper (A4 size PPC paper, C2 (manufactured by Fuji Xerox Co., Ltd.)) as a recording medium, a solid image measuring 10 cm×10 cm was formed in such a way that the quantity of ink discharged from the recording head onto the recording medium was 11 pL (per pixel). The image density of the formed image was measured using a portable RD-19 reflection densitometer (manufactured by GretagMacbeth), and the average value of the image densities obtained at 10 positions within the solid image was recorded as the image density. The image density was evaluated according to the following criteria.

good: Image density of 1.10 or higher
fail: Image density of lower than 1.10

<Satellite Evaluation Method>

A single horizontal line of dots was printed on glossy paper in such a way that the discharge quantity was 8 pL per nozzle, and cases in which single dots were not split were evaluated as "good", but cases in which single dots were split were evaluated as "fail".

In Table 1,

Surfactant 1: Softanol EP 7025 (manufactured by Nippon Shokubai Co., Ltd.) (Compound represented by formula (I), branched alkyl type $C_{12}H_{25}$, n=7, m=2)

Surfactant 2: Compound represented by formula (I) (N=7 (straight-chain), n=5, m=1)

Surfactant 3: Compound represented by formula (II) (N=7 (straight-chain), X=5 ($X_1$=1, $X_2$=3), Y=2 ($Y_1$=$Y_2$=1))

Surfactant 4: Compound represented by formula (III) (N1=5, n=8, N2=3)

Surfactant 5: Acetylene glycol, Surfynol 440 (manufactured by Nissin Chemical Industry Co., Ltd.)

Surfactant 6: Softanol 90 (manufactured by Nippon Shokubai Co., Ltd.)

As is clear from Table 1, cases in which the inks of Examples 1 to 4 according to the present disclosure were used produced excellent results in terms of continuous discharge properties (at room temperature and 40° C.), print density and satellites. In addition, the results obtained from Example 3 show that print density was particularly excellent in cases in which an ink that contained a compound represented by formula (II) was used.

Meanwhile, Comparative Examples 1 and 2, which used surfactants that did not belong to the present disclosure, exceeded the desired value for print density due to containing a non-ionic water-soluble acrylic resin, but exhibited poor continuous discharge properties (especially at 40° C.) and suffered from satellites.

Examples 5 and 6 and Comparative Examples 3 to 6

The inks of Examples 5 and 6 and Comparative Examples 3 to 6 were obtained in the same way as Example 1, except that the surfactants used were changed to surfactants 7 to 12.

Surfactants 7 to 12 are compounds represented by formula (I), in which the values of $N(R_1)$, n, m and n+m are as shown in Table 2.

TABLE 2

| | $N(R_1)$ | n | m | m + n |
|---|---|---|---|---|
| Surfactant 7 | 8 (branched) $C_4C_3C$— | 4 | 1 | 5 |
| Surfactant 8 | 10 | 7 | 5 | 12 |
| Surfactant 9 | 12 | 9 | 4 | 13 |
| Surfactant 10 | 4 | 5 | 2 | 7 |
| Surfactant 11 | 14 | 7 | 5 | 12 |
| Surfactant 12 | 10 | 2 | 4 | 6 |

In addition, the inks of Examples 5 and 6 and Comparative Examples 3 to 6 were evaluated in the same way as Example 1 in terms of continuous discharge properties (at 40° C.), print density and presence/absence of satellites. These evaluation results are shown in Table 3.

TABLE 1

| | Example 1 | Example 2 | Example 3 | Example 4 | Comparative Example 1 | Comparative Example 2 |
|---|---|---|---|---|---|---|
| Surfactant | Surfactant 1 | Surfactant 2 | Surfactant 3 | Surfactant 4 | Surfactant 5 | Surfactant 6 |
| Evaluation results | | | | | | |
| Continuous discharge properties | | | | | | |
| Room temperature | good | good | good | good | fail | good |
| 40° C. | good | good | good | good | fail | fail |
| Print density | good (1.12) | good (1.13) | good (1.20) | good (1.16) | good (1.14) | good (1.11) |
| Satellites | good | good | good | good | fail | good |

TABLE 3

|  | Example 5 | Example 6 | Comparative Example 3 | Comparative Example 4 | Comparative Example 5 | Comparative Example 6 |
|---|---|---|---|---|---|---|
| Surfactant | 7 | 8 | 9 | 10 | 11 | 12 |
| Evaluation results | | | | | | |
| Continuous discharge properties 40° C. | good | good | good | fail | good | fail |
| Print density | good (1.16) | good (1.16) | fail (1.05) | good (1.13) | good (1.12) | good (1.10) |
| Satellites | good | good | good | good | fail | fail |

It was understood from Table 3 that cases in which compounds represented by formula (I) according to the present disclosure were used produced excellent results in terms of continuous discharge properties (room temperature and 40° C.), print density and satellites even if $R_1$ was a branched chain alkyl group or a long chain alkyl group.

However, if the compound was too EO-rich, penetration deteriorated, meaning that the print density of the formed image was lower than the desired value (Comparative Example 3). In addition, it was understood that continuous discharge properties deteriorated if $R_1$ was too short (Comparative Example 4) and that the problem of satellites occurred if $R_1$ was too long (Comparative Example 5). In addition, it was understood that if the EO segment is shorter than the PO segment, surface tension was significantly reduced, meaning that the ink was poor in terms of continuous discharge properties and satellites (Comparative Example 6).

Examples 7 and 8 and Comparative Examples 7 to 11

The inks of Examples 7 and 8 and Comparative Examples 7 to 11 were obtained in the same way as Example 1, except that the surfactants used were changed to surfactants 13 to 19.

Surfactants 13 to 19 are compounds represented by formula (II), in which the values of $N(R_1)$, X, Y and X+Y are as shown in Table 4.

TABLE 4

|  | $N(R_1)$ | X and n | Y and m | X + Y | EO:PO ratio |
|---|---|---|---|---|---|
| Surfactant 14 | 13 | 5 ($X_1 = 2, X_2 = 3$), n = 2 | 1 ($Y_1 = 1$), m = 1 | 6 | 5:1 |
| Surfactant 15 | 3 | 6 ($X_1 = 2, X_2 = 3, X_3 = 1$), n = 3 | 2 ($Y_1 = 1, Y_2 = 1$), m = 2 | 8 | 5:1 |
| Surfactant 13 | 10 (branched) $C_4C_5C$- | 10 ($X_1 = 3, X_2 = 4, X_3 = 3$), n = 3 | 2 ($Y_1 = 1, Y_2 = 1$), m = 2 | 12 | 5:1 |
| Surfactant 16 | 14 | 10 ($X_1 = 3, X_2 = 4, X_3 = 3$), n = 3 | 2 ($Y_1 = 1, Y_2 = 1$), m = 2 | 12 | 5:1 |
| Surfactant 17 | 10 | 3 ($X_1 = 1, X_2 = 2$), n = 2 | 4 ($Y_1 = 2, Y_2 = 2$), m = 2 | 4 | 3:1 |
| Surfactant 18 | 10 | 2 ($X_1 = 1, X_2 = 2$), n = 2 | 4 ($Y_1 = 2, Y_2 = 2$), m = 2 | 6 | 1:2 |
| Surfactant 19 | 9 | 10 ($X_1 = 3, X_2 = 3, X_3 = 2, X_4 = 2$), n = 4 | 3 ($Y_1 = 1, Y_2 = 1, Y_3 = 1$), m = 3 | 13 | 10:3 |

In addition, the inks of Examples 7 and 8 and Comparative Examples 7 to 11 were evaluated in the same way as Example 1 in terms of continuous discharge properties (at 40° C.), print density and presence/absence of satellites. These evaluation results are shown in Table 5.

TABLE 5

|  | Example 7 | Example 8 | Comparative Example 7 | Comparative Example 8 | Comparative Example 9 | Comparative Example 10 | Comparative Example 11 |
|---|---|---|---|---|---|---|---|
| Surfactant | 13 | 14 | 15 | 16 | 17 | 18 | 19 |
| Evauation results | | | | | | | |
| Continuous discharge properties 40° C. | good | good | fail | good | fail | fail | good |
| Print density | good (1.18) | good (1.14) | good (1.17) | good (1.15) | good (1.12) | good (1.11) | fail (1.08) |
| Satellites | good | good | good | fail | good | fail | good |

It was understood from Table 5 that cases in which compounds represented by formula (II) according to the present disclosure were used produced excellent results in terms of continuous discharge properties (at 40° C.), print density and satellites even if $R_1$ was a branched chain alkyl group or a long chain alkyl group.

However, it was understood that the continuous discharge properties deteriorated if $R_1$ was too short (Comparative Example 7) and that the problem of satellites occurred if $R_1$ was too long (Comparative Example 8). In addition, it was understood that the continuous discharge properties deteriorated if the (EO) and (PO) units were too short (Comparative Example 9). In addition, it was understood that if the EO segment is shorter than the PO segment, surface tension was significantly reduced, meaning that the ink was poor in terms of continuous discharge properties and satellites (Comparative Example 10). In addition, if the compound was too EO-rich, penetration deteriorated, meaning that the print density of the formed image was lower than the desired value (Comparative Example 11).

Example 9 and Comparative Examples 12 to 15

The inks of Example 9 and Comparative Examples 12 to 15 were obtained in the same way as Example 1, except that the surfactants used were changed to surfactants 20 to 24.

Surfactants 20 to 24 are compounds represented by formula (III), in which the values of $N1(R_1)$, n, $N2(R_2)$ and $N1+N2$ are as shown in Table 6.

TABLE 6

|  | $N1(R_1)$ | n | $N2(R_2)$ | $N1 + N2$ |
|---|---|---|---|---|
| Surfactant 20 | 4 | 12 | 4 | 8 |
| Surfactant 21 | 3 | 10 | 3 | 6 |
| Surfactant 22 | 6 | 12 | 5 | 11 |
| Surfactant 23 | 4 | 3 | 4 | 8 |
| Surfactant 24 | 4 | 13 | 5 | 9 |

In addition, the inks of Example 9 and Comparative Examples 12 to 15 were evaluated in the same way as Example 1 in terms of continuous discharge properties (at 40° C.), print density and presence/absence of satellites. These evaluation results are shown in Table 7.

TABLE 7

|  | Example 9 | Comparative Example 12 | Comparative Example 13 | Comparative Example 14 | Comparative Example 15 |
|---|---|---|---|---|---|
| Surfactant | 20 | 21 | 22 | 23 | 24 |
|  |  | Evaluation results |  |  |  |
| Continuous discharge properties 40° C. | good | fail | good | good | fail |
| Print density | good (1.15) | good (1.14) | good (1.13) | fail (1.06) | good (1.1) |
| Satellites | good | good | fail | fail | good |

It was understood from Table 7 that cases in which compounds represented by formula (III) according to the present disclosure were used produced excellent results in terms of continuous discharge properties (at 40° C.), print density and satellites.

However, it was understood that continuous discharge properties deteriorated if $R_1$ was too short (Comparative Example 12) and that the problem of satellites occurred if $R_1$ was too long (Comparative Example 13). In addition, it was understood that if the (EO) chain was too short, the surface tension was reduced, meaning that the print density of the formed image was lower than the desired value and the problem of satellites occurred (Comparative Example 14). Meanwhile, it was understood that the continuous discharge properties deteriorated if the (EO) chain was too long (Comparative Example 15).

Examples 10 to 12 and Comparative Examples 16 and 17

The inks of Examples 10 to 12 and Comparative Examples 16 and 17 were obtained in the same way as Example 7, except that the added quantity (the content) of surfactant 13 (a compound represented by formula (II)) relative to the total mass of the ink was altered as shown in Table 8 below.

In addition, the inks of Examples 10 to 12 and Comparative Examples 16 and 17 were evaluated in the same way as Example 1 in terms of continuous discharge properties (at 40° C.), print density and presence/absence of satellites. These evaluation results are shown in Table 8.

TABLE 8

|  | Example 10 | Example 11 | Example 12 | Comparative Example 16 | Comparative Example 17 |
|---|---|---|---|---|---|
| Added quantity (mass %) | 0.05 | 0.2 | 0.4 | 0.02 | 0.6 |
|  |  | Evaluation results |  |  |  |
| Continuous discharge properties 40° C. | good | good | good | fail | good |
| Print density | good (1.14) | good (1.15) | good (1.18) | good (1.12) | good (1.15) |
| Satellites | good | good | good | good | fail |

As shown in Table 8, it was understood that if the added quantity of surfactant 13 relative to the total mass of the ink fell within the range 0.05 to 0.5 mass %, excellent results were obtained in terms of continuous discharge properties (at 40° C.), print density and satellites.

However, it was understood that the continuous discharge properties deteriorated if the added quantity of surfactant 13 relative to the total mass of the ink was lower than 0.05 mass % (Comparative Example 16), and that the problem of satellites occurred if the added quantity of surfactant 13 relative to the total mass of the ink exceeded 0.5 mass % (Comparative Example 17).

Examples 13 to 16 and Comparative Examples 18 and 19

The inks of Examples 13 to 16 and Comparative Examples 18 and 19 were obtained in the same way as Example 9, except that the added quantity (the content) of surfactant 20 (a compound represented by formula (III)) relative to the total mass of the ink was altered as shown in Table 9 below.

In addition, the inks of Examples 13 to 16 and Comparative Examples 18 and 19 were evaluated in the same way as Example 1 in terms of continuous discharge properties (at 40° C.), print density and presence/absence of satellites. These evaluation results are shown in Table 9.

TABLE 9

|  | Example 13 | Example 14 | Example 15 | Example 16 | Comparative Example 18 | Comparative Example 19 |
|---|---|---|---|---|---|---|
| Added quantity (mass %) | 0.06 | 0.1 | 0.2 | 0.4 | 0.02 | 0.55 |
| Evaluation results | | | | | | |
| Continuous discharge properties 40° C. | good | good | good | good | fail | good |
| Print density | good (1.12) | good (1.14) | good (1.14) | good (1.13) | good (1.11) | good (1.30) |
| Satellites | good | good | good | good | good | fail |

As shown in Table 9, it was understood that if the added quantity of surfactant 20 relative to the total mass of the ink fell within the range 0.05 to 0.5 mass %, excellent results were obtained in terms of continuous discharge properties (at 40° C.), print density and satellites.

However, it was understood that the continuous discharge properties deteriorated if the added quantity of surfactant 20 relative to the total mass of the ink was lower than 0.05 mass % (Comparative Example 18), and that the problem of satellites occurred if the added quantity of surfactant 13 relative to the total mass of the ink exceeded 0.5 mass % (Comparative Example 19).

Production Example 4

Non-Ionic Water-Soluble Acrylic Resins A, B, D and E)

These non-ionic water-soluble acrylic resins were produced in the same way as in Production Example 3, except that the formulation was altered as shown in Table 10 below.

The surface tension of these resins and the molecular weight of the hydrophobic segments in these resins are also shown in Table 10. Moreover, the Joncryl 680 mentioned in Table 10 is a commercially available resin (manufactured by BASF).

TABLE 10

| Resin | Components (mass ratio) | Surface tension | Molecular weight |
|---|---|---|---|
| Resin A | PEGA/BA/MMA = 50/20/30 | 41.0 | 3000 |
| Resin B | PEGA/BA/LA/MMA = 50/10/10/30 | 33.2 | 5000 |
| Resin D | PEGA/BA/PPGA/LA/MMA = 60/10/10/10/10 | 30.7 | 5000 |
| Resin E | PEGA/LA/MMA = 60/30/10 | Insoluble in water | 4000 |
| Joncryl 680 | Anionic styrene-acrylic resin | 53.0 | 4900 |

Moreover, the PPGA mentioned in Table 10 is polypropylene glycol) acrylate.

Examples 17 and 18 and Comparative Examples 20 to 24

In Examples 17 and 18 and Comparative Examples 20 to 24, inks were prepared by a method similar to that in Example 1 by altering only the type of acrylic resin contained in composition 2 (see Table 10).

(Composition 2)
Pigment dispersion obtained in Production Example 2: 40 mass %
Tri(ethylene glycol) monobutyl ether: 4.5 mass %
2-pyrrolidone (dissolution stabilizer): 5.0 mass %
Surfactant 1: 0.4 mass %
Non-ionic water-soluble acrylic resin mentioned in Table 10: 0.4 mass %
1,2-octane diol: 0.6 mass %
Glycerin: 15 mass %
1,3-propane diol: 15 mass %
Ion exchanged water: balance In addition, the inks of Examples 17 and 18 and Comparative Examples 20 to 24 were evaluated in the same way as Example 1 in terms of continuous discharge properties (at 40° C.), print density and presence/absence of satellites. These evaluation results are shown in Table 11.

TABLE 11

|  | Example 17 | Example 18 | Comparative Example 20 | Comparative Example 21 | Comparative Example 22 | Comparative Example 23 | Comparative Example 24 |
|---|---|---|---|---|---|---|---|
| Resin | C | D | None | A | B | E | 680 |
| Surface tension | 30.6 | 30.7 | — | 14.0 | 33.2 | Insoluble in water | 53.0 |
| Evaluation results | | | | | | | |
| Continuous discharge properties 40° C. | good | good | fail | fail | fail | good | fail |
| Print density | good (1.14) | good (1.12) | fail (1.08) | good (1.12) | good (1.14) | fail (0.98) | good (1.12) |
| Satellites | good | good | good | good | good | fail | good |

As shown in Table 11, it was understood that in cases in which the ink contained the non-ionic water-soluble acrylic resin according to the present disclosure, excellent results were obtained in terms of continuous discharge properties (at 40° C.), print density and satellites.

However, continuous discharge properties deteriorated and the print density of a formed image was lower than the desired value in a case in which the ink did not contain the non-ionic water-soluble acrylic resin according to the present disclosure (Comparative Example 20). In addition, continuous discharge properties deteriorated in cases in which a resin having a surface tension of greater than 33 mN/m was used (Comparative Examples 21, 22 and 24). In addition, by using a resin insoluble in water, the print density of a formed image was lower than the desired value and the problem of satellites occurred (Comparative Example 23).

Examples 19 to 21 and Comparative Examples 25 and 26

The inks of Examples 19 to 21 and Comparative Examples 25 and 26 were obtained in the same way as Example 17, except that the non-ionic water-soluble acrylic resin was changed to non-ionic water-soluble acrylic resins D-1 to D-5. Moreover, non-ionic water-soluble acrylic resins D-1 to D-5 are the same as non-ionic water-soluble acrylic resin D, and are resins in which the surface tension and average molecular weight differ as shown in Table 12 below.

In addition, the inks of Examples 19 to 21 and Comparative Examples 25 and 26 were evaluated in the same way as Example 1 in terms of continuous discharge properties (at 40° C.), print density and presence/absence of satellites. These evaluation results are shown in Table 12.

TABLE 12

| | Example 19 | Example 20 | Example 21 | Comparative Example 25 | Comparative Example 26 |
|---|---|---|---|---|---|
| Resin | D-2 | D-3 | D-4 | D-1 | D-5 |
| Surface tension | 32.1 | 30.7 | 29.1 | 32.6 | 28.5 |
| Molecular weight | 3000 | 5000 | 8000 | 2500 | 9000 |
| Evaluation results | | | | | |
| Continuous discharge properties 40° C. | good | good | good | good | good |
| Print density | good (1.11) | good (1.12) | good (1.17) | fail (1.06) | good (1.15) |
| Satellites | good | good | good | good | fail |

It was understood from Table 12 that cases in which the non-ionic water-soluble acrylic resin according to the present disclosure were used produced excellent results in terms of continuous discharge properties (at 40° C.), print density and satellites.

However, the print density of a formed image was lower than the desired value in cases in which the molecular weight of the hydrophobic segment in the non-ionic water-soluble acrylic resin was low, even if the surface tension value was satisfied (Comparative Example 25). However, it was understood that the surface tension decreased and the problem of satellites occurred in cases in which the molecular weight of the hydrophobic segment was too high (Comparative Example 26).

Examples 22 to 24 and Comparative Examples 27 and 28

The inks of Examples 22 to 24 and Comparative Examples 27 and 28 were obtained in the same way as Example 9, except that the added quantity (the content) of the non-ionic water-soluble acrylic resin C was altered as shown in Table 13 below.

In addition, the inks of Examples 22 to 24 and Comparative Examples 27 and 28 were evaluated in the same way as Example 1 in terms of continuous discharge properties (at 40° C.), print density and presence/absence of satellites. These evaluation results are shown in Table 13.

TABLE 13

| | Example 22 | Example 23 | Example 24 | Comparative Example 27 | Comparative Example 28 |
|---|---|---|---|---|---|
| Added quantity of resin (mass %) | 0.05 | 0.3 | 0.5 | 0.03 | 0.6 |
| Evaluation results | | | | | |
| Continuous discharge properties 40° C. | good | good | good | fail | good |
| Print density | good (1.15) | good (1.17) | good (1.14) | fail (1.02) | fail (1.09) |
| Satellites | good | good | good | good | fail |

As shown in Table 13, it was understood that if the added quantity of the non-ionic water-soluble acrylic resin C relative to the total mass of the ink fell within the range 0.05 to 0.5 mass %, excellent results were obtained in terms of continuous discharge properties (at 40° C.), print density and satellites.

However, it was understood that continuous discharge properties deteriorated and the print density of a formed image was lower than the desired value in cases in which the added quantity of the non-ionic water-soluble acrylic resin C relative to the total mass of the ink was lower than 0.05 mass % (Comparative Example 27), and that the print density of a formed image was lower than the desired value and the problem of satellites occurred in cases in which the added quantity of the non-ionic water-soluble acrylic resin C relative to the total mass of the ink exceeded 0.5 mass % (Comparative Example 28).

Reference Examples 1 to 7

The inks of Reference Examples 1 to 6 were obtained in the same way as Example 1, except that surfactants 1 to 6 were used and the inks did not contain a non-ionic water-soluble acrylic resin. In addition, the ink of Reference Example 7 was obtained in the same way as Example 1, except that the ink did not contain a non-ionic water-soluble acrylic resin and a surfactant.

In addition, the inks of Reference Examples 1 to 7 were evaluated in the same way as Example 1 in terms of continuous discharge properties (at 40° C.), print density and presence/absence of satellites. These evaluation results are shown in Table 14.

TABLE 14

| | Reference Example 1 | Reference Example 2 | Reference Example 3 | Reference Example 4 | Reference Example 5 | Reference Example 6 | Reference Example 7 |
|---|---|---|---|---|---|---|---|
| Surfactant | 5 | 6 | 1 | 2 | 3 | 4 | none |
| Evaluation results | | | | | | | |
| Continuous discharge properties | | | | | | | |
| Room temperature | fail | good | fail | good | good | good | fail |
| 40° C. | fail | fail | fail | fail | fail | fail | fail |
| Print density | good (1.13) | fail (1.08) | good (1.10) | good (1.12) | good 1.15) | good (1.12) | fail (1.07) |
| Satellites | good | good | good | good | good | good | good |

It can be understood from Table 14 that it is not possible to achieve continuous discharge properties at 40° C. in particular if a non-ionic water-soluble acrylic resin is not used (Reference Examples 3 to 6). Continuous discharge properties could not be achieved in the case of a commercially available surfactant (Surfynol) (surfactant 5) (Reference Example 1). It is thought that this is because the skeleton of Surfynol leads to low anti-foaming properties. In addition, the print density of a formed image was also lower than the desired value in the case of the commercially available Softanol 90 (surfactant 6, R-(EO) type) (Reference Example 2). In addition, the continuous discharge properties and the print density were both poor in Reference Example 7, in which the ink did not contain a non-ionic water-soluble acrylic resin and a surfactant.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. An ink for an ink jet recording apparatus, wherein
the ink contains at least water, a pigment dispersion, a penetrant, a non-ionic water-soluble acrylic resin and a surfactant of a compound represented by general formula (I), (II) or (III),
the penetrant contains an alkane diol having 8 or 9 carbon atoms,
the content of the alkane diol is 0.3 to 1.0 mass % relative to the total mass of the ink,
the content of the surfactant is 0.05 to 0.5 mass % relative to the total mass of the ink,
the content of the non-ionic water-soluble acrylic resin is 0.05 to 0.5 mass % relative to the total mass of the ink,
the non-ionic water-soluble acrylic resin has an average molecular weight of 3000 to 8000 and has a hydrophobic segment, and when the non-ionic water-soluble acrylic resin is added to water at a quantity of 0.1 mass % relative to 100 mass % of the water, the surface tension of the water is 29 to 33 mN/m:

General Formula (I)

(I)

(in general formula (I), $R_1$ is $C_NH_{2N+1}$ and may be straight chain or branched chain, N is an integer whereby $7 \leq N \leq 13$, -E-O— is —$CH_2CH_2$—O—, —P—O— is —$CH_2CH(CH_3)$—O—, n and m are numbers whereby $5 \leq n+m \leq 12$ and n>m, and repeating sequences consisting of (-E-O—) and (—P—O—) may be in a random pattern or a block pattern)

General Formula (II)

(II)

(in general formula (II), $R_1$ is $C_NH_{2N+1}$ and may be straight chain or branched chain, N is an integer whereby $7 \leq N \leq 13$, -E-O— is —$CH_2CH_2$—O—, —P—O— is —$CH_2CH(CH_3)$—O—, X and Y are integers whereby $5 \leq X+Y \leq 12$ and X>Y (provided that X=$X_1$+$X_2$+ . . . Xn, and Y=$Y_1$+$Y_2$+ . . . Ym), repeating sequences consisting of (-E-O—) and (—P—O—) may be in a random pattern or a block pattern, and n and m are numbers whereby (-E-O—):(—P—O—) is between 10:3 and 5:1, and are such that 11>n>2 and 6>m>1)

General Formula (III)

(III)

(in general formula (III), $R_1$ is $C_{N1}H_{2N1+1}$ and may be straight chain or branched chain, $R_2$ is $C_{N2}H_{2N2+1}$ and may be straight chain or branched chain, N1 and N2 are integers whereby $7 \leq N1+N2 \leq 10$, -E-O— is —$CH_2CH_2$—O—, and n is a integers whereby $4 \leq n \leq 12$).

2. The ink for an ink jet recording apparatus according to claim 1, wherein the alkane diol is one or more compounds selected from the group consisting of 1,2-octane diol, 2-ethyl-1,3-hexane diol, 2-butyl-2-ethyl-1,3-propane diol, 2,2,4-trimethyl-1,3-pentane diol and 2,4-diethyl-1,5-pentane diol.

3. An image forming method of forming an image by means of an ink jet recording apparatus using the ink for an ink jet recording apparatus according to claim 1.

4. The image forming method according to claim 3, wherein a recording medium is not heated when an image is formed.

5. The image forming method according to claim 3, wherein the recording method of the ink jet recording apparatus is a line head type recording method.

* * * * *